Patented May 18, 1948

2,441,597

UNITED STATES PATENT OFFICE 2,441,597

MANUFACTURE OF POLYPENTAERYTHRITOLS

John P. Remensnyder, Metuchen, N. J., Philip I. Bowman, Syracuse 10, N. Y., and Robert H. Barth, Ridgewood, N. J., assignors to Heyden Chemical Corporation, New York, N. Y., a corporation of Delaware No Drawing. Application April 24, 1943, Serial No. 484,478

9 Claims. (Cl. 260—615)

This invention relates to an improved process for the manufacture of pentaerythritol and polypentaerythritols by the action of acetaldehyde and formaldehyde in the presence of an alkali. The invention relates to a process similar to that described in application Serial No. 442,620, filed May 12, 1942, by Raymond F. Burghardt and Robert H. Barth, which has issued as Patent No. 2,401,749.

It is well known that pentaerythritol and polypentaerythritols are formed by the reaction of 4 to 5 molecules of formaldehyde with 1 molecule of acetaldehyde in the presence of 1 to 1½ equivalents of alkali. Alkalies which have been suggested are the hydroxides of sodium, calcium, potassium and barium, as well as certain carbonates such as those of sodium and potassium. In commercial practice the alkalies most commonly used are sodium hydroxide and calcium hydroxide, although sodium hydroxide has not been used generaly, since it has been considered too strong a condensing agent.

In the manufacture of pentaerythritol by the condensation of acetaldehyde and formaldehyde, there are also formed smaller amounts of other hydroxylated substances. One of these, which is obtained in a considerable amount, is dipentaerythritol, which is an ether, having the following structure:

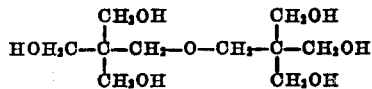

(See Brün, "Ueber den Dipentaerythrit," Wilhelm Greven, Krefeld, 1930). Another hydroxylated substance, which is obtained in somewhat smaller amounts, is white and crystalline, melts at 230–240° C., and has a hydroxyl value of 33%. The chemical structure of this substance is not known, and there is a possibility that it is a mixture of chemical entities. It seems fairly certain, however, that it is related to dipentaerythritol in that it contains pentaerythritol residues bound by ether linkages. Regardless of chemical structure, for purposes of definition in this specification and in the claims, this substance will be termed "pleopentaerythritol." According to the best evidence available, pleopentaerythritol is probably a mixture of dipentaerythritol, tripentaerythritol, and possibly additional related alcohols.

The material referred to as "pleopentaerythritol" was crystallized from 100 times its weight of water. The product obtained is a crude tripentaerythritol. If this is recrystallized twice from water, a pure tripentaerythritol is obtained, which has a melting point of 242–248° C., and the following analysis:

|  | Per cent Calculated | Per cent Found |
|---|---|---|
| Carbon | 48.35 | 47.97 |
| Hydrogen | 8.66 | 8.20 |

The formula would be as follows:

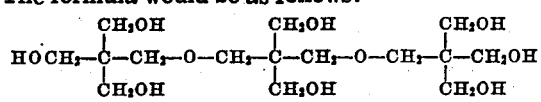

This compound reacts with formaldehyde in the presence of aqueous hydrochloric acid to give a compound, melting point 176–178° C., which corresponds to the following formula and has the following analysis:

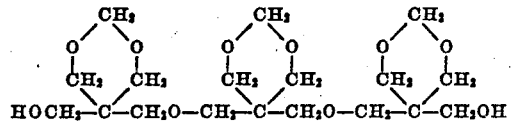

|  | Per cent Calculated | Per cent Found |
|---|---|---|
| Carbon | 52.90 | 54.3 |
| Hydrogen | 7.90 | 7.0 |
| Molecular weight | 408.4 | 413 |

When tripentaerythritol is acetylated with acetic anhydride a compound is obtained having a melting point of 85° C., and which corresponds to the following formula, and has the following analysis:

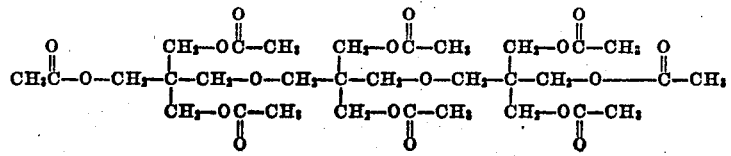

| | Per cent Calculated | Per cent Found |
|---|---|---|
| Carbon | 52.53 | 52.6 |
| Hydrogen | 6.82 | 7.08 |
| Molecular Weight | 708.7 | 704 |
| CC N/1 NaOH consumed per gram in saponification | 11.29 | 11.22 |

Dipentaerythritol, tripentaerythritol, and pleopentaerythritol may be grouped together under the generic term "polypentaerythritols," by which term is meant those compounds, having higher molecular weights than pentaerythritol which are formed either actually or theoretically by etherifying one or more of the hydroxyl groups of pentaerythritol with other pentaerythritol residues.

The processes heretofore known for the production of pentaerythritol and polypentaerythritols have always involved the use of dilute alkali and a dilute solution of the two aldehydes. The total concentration of aldehydes has always been less than 20%, usually 10% to 15%. This has been done apparently to avoid side reactions which give syrupy, dark colored products. The reaction temperatures which are reported are within the range from 20° to 50° C.

In the copending application Serial No. 442,620 (Patent No. 2,401,749) are described conditions which increase the yield of solid products, namely pentaerythritol and polypentaerythritols. These conditions include a lowered reaction temperature and a higher concentration of aldehydes. In the process described in the said copending application special attention was paid to the formation of a high yield of fairly pure pentaerythritol containing a minimum of polypentaerythritols, including about 5–10% dipentaerythritol. This mixture represented about 85–90% of the total products, and the polypentaerythritols accounted for 10–15% when separated in the manner described in the examples.

The main purpose of this invention is to increase the ratio of polypentaerythritols to the pentaerythritol. These polypentaerythritols are very useful in the resin and coating industries. This increase in the proportion of polypentaerythritol is effected not by changing the conditions which were found to be so beneficial in the said copending application, but by incorporating those conditions with a newly discovered fact. This fact is that the proportion of polypentaerythritols is increased if pentaerythritol in some form is added to the reaction medium. The pentaerythritol may be added from a previously prepared batch, and may serve as a reactant for the formation of polypentaerythritols. If, however, the conditions of the said copending application are not used, namely, that the temperatures during the addition of the acetaldehyde be between 15° and 30° C., preferably between 20° and 25° C., and the concentration of the formaldehyde solution used be 20–30%, and of the acetaldehyde be 100%, poor total yields of pentaerythritol and dipentaerythritol are obtained, although the ratio of dipentaerythritol to pentaerythritol is increased.

It has been further discovered that addition of the above mixture of aldehydes to a solution of pentaerythritol in 30% aqueous caustic soda (sodium hydroxide) solution caused a remarkable increase in the dipentaerythritol yield. In fact, dipentaerythritol can be made the major product by a proper choice of ratios of reactants. It is not necessary to use pure pentaerythritol, and both crude wet material from commercial evaporators (which may contain a high ash of sodium formate) or a high quality reaction liquor of the type obtained from the process described in the said copending application, or a mixture, may be utilized.

It has been further discovered that by use of proportions of sodium hydroxide in excess of 1.4 mols per mol of acetaldehyde, preferably 1.7 to 2 mols, it is possible to increase the proportion of tripentaerythritol produced. The use of stronger formaldehyde solutions, up to a concentration of 45% formaldehyde, and the use of higher temperatures, up to 40° C., in completely enclosed reactors is desirable for the purpose of increasing the ratio of polypentaerythritols to monopentaerythritol and in maintaining high yields of condensation products.

The following examples illustrate our invention:

*Example 1.*—To a mixture consisting of 1500 parts of 20% formaldehyde solution (approximately 10 mols) containing 272 parts of monopentaerythritol (approximately 2 mols) and 362 parts of 31% sodium hydroxide solution (approximately 2.8 mols) were added slowly 88 parts of acetaldehyde (approximately 2 mols). The time of addition of the acetaldehyde was 1 hour. The temperature maintained during the addition of the acetaldehyde was 22° C. The mixture was then kept at a temperature of 58° C. for 2 hours, after which time the formaldehyde concentration determined by titration with sodium bisulfite solution corresponded to 0.32% formaldehyde. The mixture was neutralized to a pH of 8 with formic acid, and the specific gravity was adjusted to 1.100 at 25/25° C. The pleopentaerythritol was filtered off, washed and dried. The filtrate was concentrated to a specific gravity of 1.270 at 25° C. under vacuum, and the crystals of technical pentaerythritol filtered, washed well with methanol, and dried.

The pleopentaerythritol was found to contain 35.4% tripentaerythritol, 25% dipentaerythritol, and 37.6% of monopentaerythritol by fractional crystallization. Upon analysis, the fraction of technical pentaerythritol obtained from the filtrate was found to contain 96.8% monopentaerythritol and 3.2% dipentaerythritol, by fractional crystallization.

The total yield of tripentaerythritol based on the acetaldehyde added was 11.85%; that of dipentaerythritol was 12.8%; and that of monopentaerythritol was 51.5%. The total yield of solids was 76.15%, based on the acetaldehyde, the weight of monopentaerythritol having been corrected for the monopentaerythritol added at the start.

*Example 2.*—To a mixture consisting of 1500 parts of 20% formaldehyde solution (approximately 10 mols), 272 parts of technical pentaerythritol (approximately 2 mols), and 362 parts of 31% sodium hydroxide solution (approximately 2.8 mols) were added slowly 88 parts of acetaldehyde (approximately 2 mols). The time of addition of the acetaldehyde was 1 hour. The temperature maintained during the addition of the acetaldehyde was 22° C. The mixture was kept at a temperature of 58° C. for 2 hours, after which time the formaldehyde concentration determined by titration with sodium bisulfite solution corresponded to 0.05%. The mixture was neutralized to a pH of 8 with formic acid, and the specific gravity was adjusted to 1.100 at 25° C. The pleopentaerythritol was filtered off, washed and dried. The filtrate was concentrated to a specific gravity of 1.270 at 25° C. under vacuum, and the technical pentaerythritol crystals filtered, washed well with methanol, and dried.

The pleopentaerythritol was found to contain 44.4% tripentaerythritol, 34% dipentaerythritol, and 21.6% monopentaerythritol by fractional crystallization. Upon analysis the fraction of technical pentaerythritol obtained from the filtrate was found to contain 90% monopentaerythritol and 10% dipentaerythritol by fractional crystallization.

The yield of tripentaerythritol based on the acetaldehyde added was 9.65%; that of dipentaerythritol was 23.2%; and that of monopentaerythritol was 47.8%. The total yield of solids was 80.85%, based on the acetaldehyde.

This example, which describes a procedure substantially identical with the procedure of Example 1, illustrates the possible variations, in yields, which may be expected in the practice of the process of the invention.

Example 3.—A mixture consisting of 1350 parts of 20% formaldehyde solution (approximately 9 mols), 930 parts of 9.5% acetaldehyde solution (approximately 2 mols), and 358 parts of 29% sodium hydroxide solution (approximately 2.6 mols) was made in one minute. The maximum exothermic reaction temperature reached was 52° C. The mixture was then kept at a temperature of 58° C. for 11 hours. After this time the formaldehyde concentration determined by titration with sodium bisulfite corresponded to 0.32%.

To the above mixture at room temperature were added in one minute another batch of the same reactants in the same amounts, namely, 1350 parts of 20% formaldehyde solution, 930 parts of 9.5% acetaldehyde solution, and 358 parts of 29% sodium hydroxide solution. The maximum exothermic reaction temperature reached was 38° C. The mixture was then kept at a temperature of 58° C. for 12 hours, after which time the formaldehyde concentration determined by titration with sodium bisulfite corresponded to 0.35%.

To the above mixture was again added in one minute another batch of the same reactants in twice the previously used quantities, namely, 2700 parts of 20% formaldehyde solution, 1860 parts of 9.5% acetaldehyde solution, and 716 parts of 29% sodium hydroxide solution. The maximum reaction temperature attained was 45° C. The mixture was then kept at a temperature of 58° C. for 10 hours. After this time the formaldehyde concentration determined by titration with sodium bisulfite solution corresponded to 0.32%. The reaction mixture was then neutralized to a pH of 8 with formic acid. The specific gravity was 1.070 at 25° C. The pleopentaerythritol was filtered off, washed and dried. The filtrate was concentrated to a specific gravity of 1.270 at 25° C. under vacuum, and the crystals filtered, washed well with methanol, and dried.

The yield of monopentaerythritol based on the total acetaldehyde that was added to the reaction mixture was 55%; the yield of dipentaerythritol was 11.2% by fractional crystallization; and that of tripentaerythritol was 6.5%.

Example 4.—A mixture consisting of 1360 parts of 20% formaldehyde solution (approximately 9.1 mols) and 88 parts of 100% acetaldehyde (approximately 2 mols) was added slowly over a period of 1 hour and 35 minutes to a solution of 272 parts of monopentaerythritol (approximately 2 mols) dissolved in a mixture of 362 parts of 31% sodium hydroxide solution (approximately 2.8 mols) and 138 parts of 20% formaldehyde solution (approximately 0.9 mol). The temperature was maintained between 20 and 23° C. After heating the reaction liquor to 58° C. and maintaining it at said temperature for 2 hours, the formaldehyde concentration determined by titration corresponded to 0.15% formaldehyde. This solution was cooled to 25° C., neutralized to a pH of 8 with formic acid, and the specific gravity adjusted to 1.100. The polypentaerythritols were filtered off, washed and dried. The filtrate was concentrated to a specific gravity of 1.270, and the crystals formed were washed with methanol and dried. Upon analysis by recrystallization, the two solid fractions were found to represent a total yield of 75.7%, based on the acetaldehyde used. This was made up of the following individual yields obtained by crystallization of the above two fractions: % monopentaerythritol, 28.0; % dipentaerythritol, 39.4; and % tripentaerythritol, 8.3.

Example 5.—A mixture consisting of 627 parts of 43.1% formaldehyde solution (approximately 9 mols) and 88 parts of liquid acetaldehyde (approximately 2 mols) was added in 1 hour to 69.7 parts of 43.1% formaldehyde solution (approximately 1 mol) mixed with 437 parts of 32% sodium hydroxide solution (approximately 3.5 mols) and 272 parts of dissolved pentaerythritol (approximately 2 mols) in a completely enclosed reaction vessel while the temperature of the mixture was maintained between 40° and 43° C. After heating the reaction liquor to 58° C. and maintaining it at said temperature for 2 hours, the formaldehyde concentration determined by titration corresponded to 0.35% formaldehyde. This solution was cooled to 25° C. and processed as in Example 4.

The yield of tripentaerythritol was 29.9%; the yield of dipentaerythritol was 38.5% and the yield of monopentaerythritol was 10.2%.

Inasmuch as the foregoing description comprises preferred embodiments of the invention, it is to be understood that the invention is not limited thereto and that modifications and variations may be made therein without departing substantially from the invention, which is to be limited solely by the scope of the appended claims.

Reference is made to our application Serial No. 739,646, filed April 5, 1947, which is a division of the present application and in which is claimed subject matter disclosed but not claimed herein.

Having thus described our invention, what we claim as new and desire to secure by Letters Patent is:

1. The process of preparing a polypentaerythritol comprising adding to an aqueous solution containing a mixture of 1 molecular proportion of pentaerythritol, not less than 1.4 molecular proportions of sodium hydroxide, and not more than 4 molecular proportions of formaldehyde, a mixture of 1 molecular proportion of acetaldehyde and sufficient formaldehyde to make the ratio of total formaldehyde to acetaldehyde between 4½ and 5 to 1.

2. The process described in claim 1, in which the ratio of sodium hydroxide is not less than 1.7 mols and not greater than 2.0 mols to 1 mol of acetaldehyde.

3. A process as defined in claim 1 in which the molecular ratio of sodium hydroxide to acetaldehyde is not less than approximately 1.7 to 1 and not greater than approximately 2.0 to 1 and the starting formaldehyde concentration is between approximately 40% and approximately 50%.

4. A process as defined in claim 1 in which the temperature during the addition of the acetaldehyde is maintained between approximately 15° C. and approximately 45° C.

5. The process of preparing a polypentaerythritol comprising adding to an aqueous solution containing a mixture of 1 molecular proportion of pentaerythritol, not less than 1.4 molecular proportions of sodium hydroxide, and not more than ½ molecular proportion of formaldehyde, a mixture of 1 molecular proportion of acetaldehyde and sufficient formaldehyde to make the ratio of total formaldehyde to acetaldehyde between 4½ and 5 to 1.

6. The process described in claim 5, in which the ratio of sodium hydroxide is not less than 1.7 mols and not greater than 2.0 mols to 1 mol of acetaldehyde.

7. A process as defined in claim 5 in which the molecular ratio of sodium hydroxide to acetaldehyde is not less than approximately 1.7 to 1 and not greater than approximately 2.0 to 1 and the starting formaldehyde concentration is between approximately 40% and approximately 50%.

8. A process as defined in claim 5 in which the temperature during the addition of the acetaldehyde is maintained between approximately 15° and approximately 45° C.

9. A process for the production of a polypentaerythritol which comprises adding a mixture consisting of approximately 4.5 molecular proportions of formaldehyde and 1 molecular proportion of acetaldehyde to a reaction mixture containing approximately 1 molecular proportion of monopentaerythritol dissolved in an aqueous solution containing approximately 1.4 molecular proportions of sodium hydroxide and approximately 0.5 molecular proportion of formaldehyde, maintaining said reaction mixture at a temperature between approximately 15° and approximately 45° C. during the addition of the mixture of formaldehyde and acetaldehyde, and thereafter recovering the polypentaerythritol from the reaction mixture.

JOHN P. REMENSNYDER.
PHILIP I. BOWMAN.
ROBERT H. BARTH.

REFERENCES CITED

The following references are of record in the file of this patent:

UNITED STATES PATENTS

| Number | Name | Date |
| --- | --- | --- |
| 2,004,010 | Naujoks | June 4, 1935 |
| 2,251,236 | Wyler | July 29, 1941 |
| 2,325,589 | Bried | Aug 3, 1943 |